(12) United States Patent
Rogers

(10) Patent No.: US 7,229,086 B1
(45) Date of Patent: Jun. 12, 2007

(54) MOTOR VEHICLE SWAY CONTROL ASSEMBLY

(76) Inventor: Robert Louis Rogers, 140 Blackberry Run, Fayetteville, GA (US) 30214

( * ) Notice: Subject to any disclaimer, the term of this patent is extended or adjusted under 35 U.S.C. 154(b) by 501 days.

(21) Appl. No.: 10/858,321

(22) Filed: Jun. 1, 2004

(51) Int. Cl.
*B60G 21/05* (2006.01)

(52) U.S. Cl. .............................................. 280/124.106

(58) Field of Classification Search ......... 280/124.106, 280/124.107, 5.502, 5.506, 5.507
See application file for complete search history.

(56) References Cited

U.S. PATENT DOCUMENTS

| | | | |
|---|---|---|---|
| 1,842,418 | A | 1/1932 | Mercier |
| 2,094,174 | A | 9/1937 | Kittel |
| 3,717,355 | A | 2/1973 | De Mars |
| 3,850,445 | A | 11/1974 | Borns et al. |
| 3,866,724 | A | 2/1975 | Hollnagel |
| 3,917,307 | A | 11/1975 | Shoebridge |
| 3,948,567 | A | 4/1976 | Kasselmann et al. |
| 4,014,564 | A | 3/1977 | Coble |
| 4,046,395 | A | 9/1977 | Smith, III |
| 4,079,954 | A | 3/1978 | Komarnicki et al. |
| 4,168,844 | A | 9/1979 | Smith |
| 4,181,324 | A | 1/1980 | Hixon |
| 4,218,072 | A | 8/1980 | Wallis |
| 4,262,929 | A | 4/1981 | Pierce |
| 4,518,171 | A | 5/1985 | Hendenberg |
| 4,580,798 | A | 4/1986 | Roelofs |
| 4,693,486 | A | 9/1987 | Pierce et al. |
| 4,697,817 | A | 10/1987 | Jefferson |
| 5,039,124 | A | 8/1991 | Widmer |
| 5,527,053 | A | 6/1996 | Howard |
| 5,536,028 | A | 7/1996 | Howard |
| 6,019,384 | A | 2/2000 | Finch |
| 6,349,952 | B1 | 2/2002 | Kallstrom |
| 6,523,842 | B2 | 2/2003 | Andrews |
| 2002/0005623 | A1 | 1/2002 | Andrews |

FOREIGN PATENT DOCUMENTS

| | | |
|---|---|---|
| FR | 2 702 709 | 9/1994 |
| GB | 2 030 088 A | 4/1980 |

OTHER PUBLICATIONS

Motor Home Magazine, Product Evaluation, Apr. 2004, p. 81-82, Evaluation of Henderson's Trac Bar Kit.

*Primary Examiner*—Faye M. Fleming
(74) *Attorney, Agent, or Firm*—Myers & Kaplan, LLC; George P. Bonanto; Barry E. Kaplan

(57) ABSTRACT

An improved vehicle sway control assembly designed to limit excessive side swaying of front engine rear axle driven motor vehicles during all driving conditions. The system utilizes two frame brackets (77), (97), one axle/spring bracket (129), and two rods (35), (67). The first rod (35) has one end attached to a frame bracket (77) and the other end to the axle/spring bracket (129). It incorporates a telescoping feature allowing the rod end nearest the frame bracket (77) to telescope. The second rod (67) is attached on the opposite side to a frame bracket (97) on one end and a mid section plate (34) on the telescoping rod (35) on the other end. The counter rotational arch of the second rod (67) will force the telescoping rod (35) to extend thus canceling the telescoping rod (35) arch curve travel if it were a solid rod. The overall design will limit axle (166) to frame (78) side movement while providing near straight vertical axle (166) travel.

2 Claims, 4 Drawing Sheets

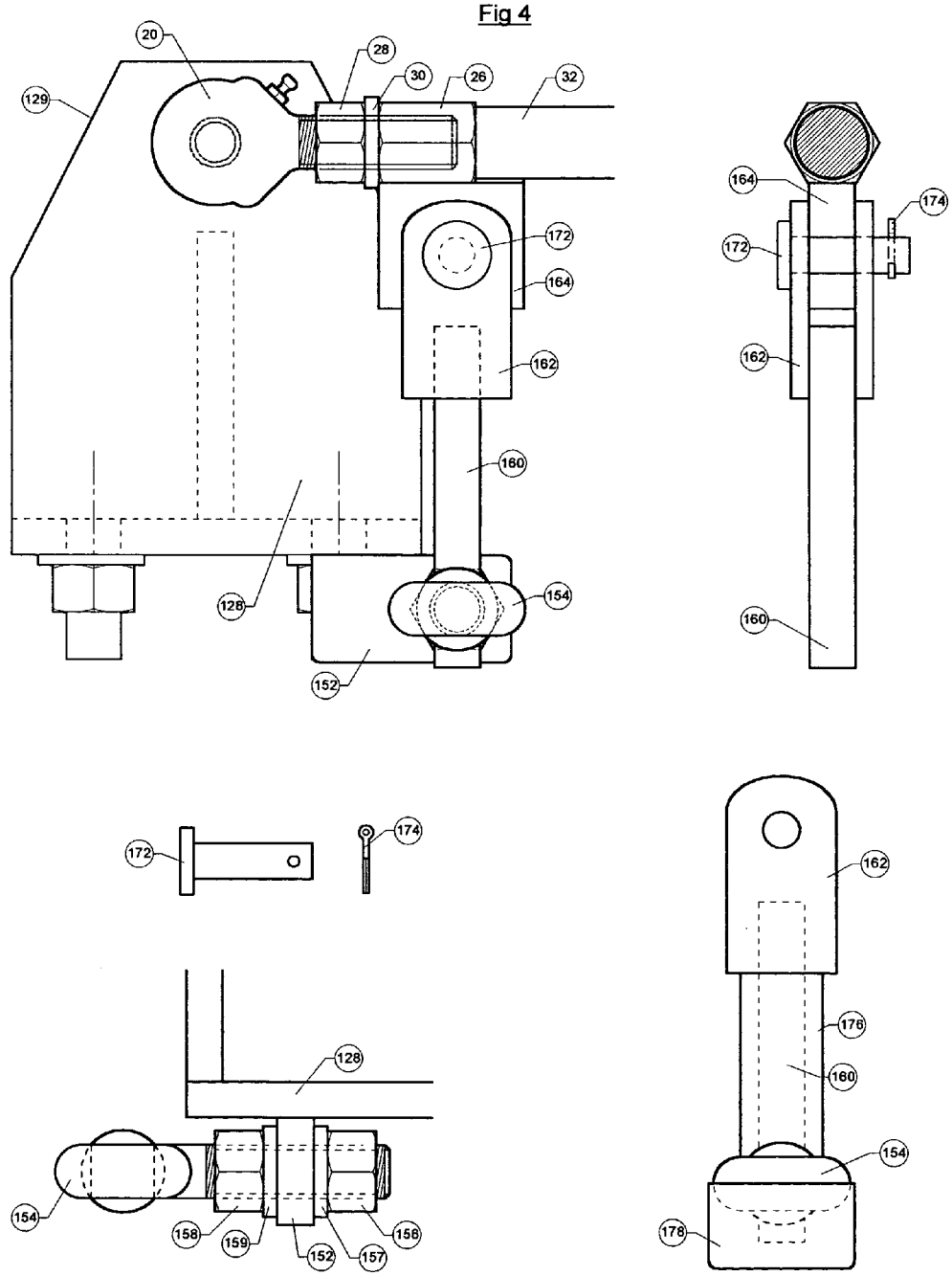

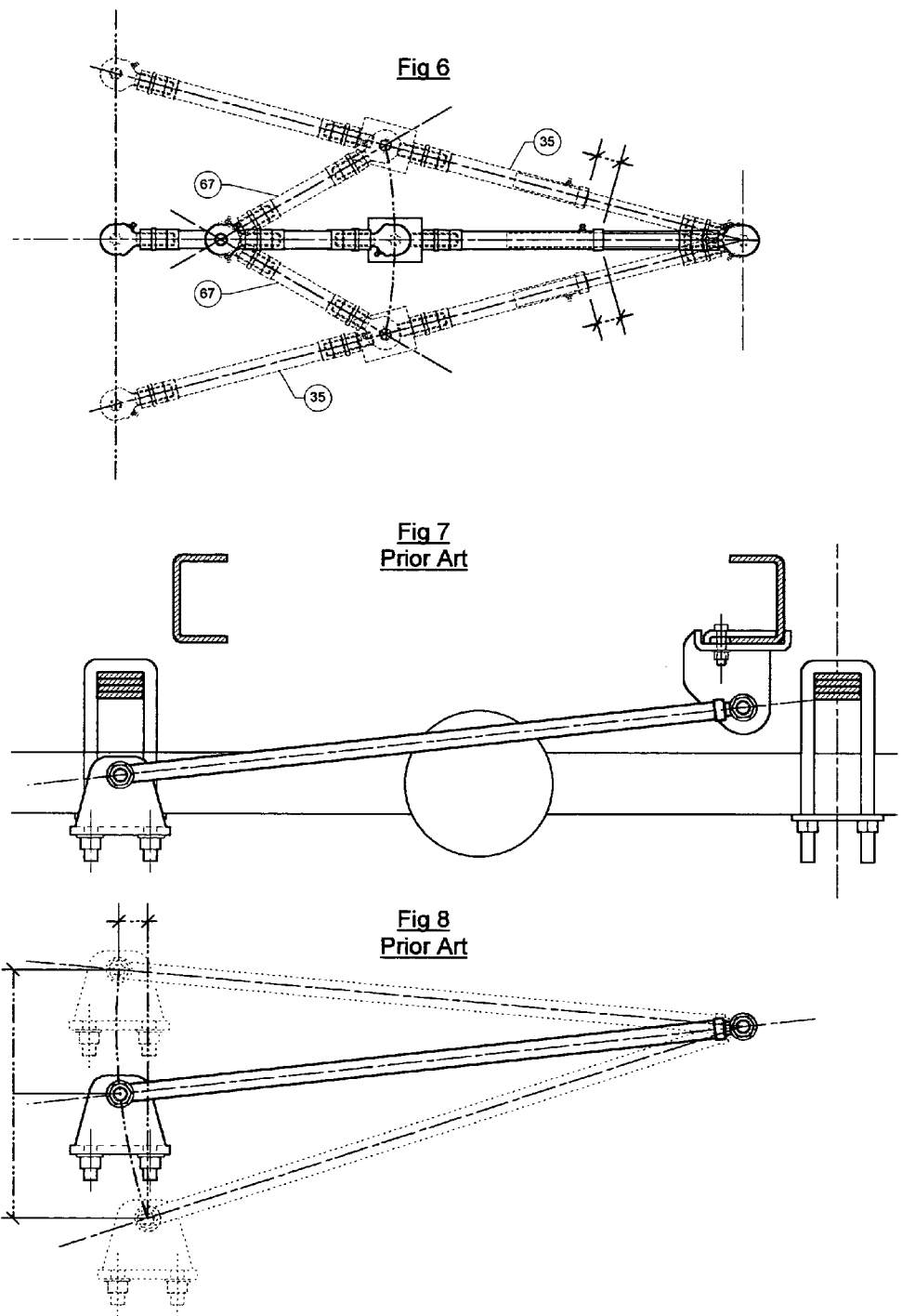

MOTOR VEHICLE SWAY CONTROL ASSEMBLY

CROSS-REFERENCE TO RELATED APPLICATION

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

This invention pertains to a sway control device that will, when installed, greatly reduce unwanted vehicle side to side swaying created by wind, uneven road surfaces or other passing vehicles when the vehicle is traveling on smooth or bumpy surfaces.

BACKGROUND OF THE INVENTION

Currently most factory produced front engine powered rear axle driven vehicles have their rear axle assembly mounted on coil springs, leaf springs or air suspension assemblies with roll bars and shock absorbers. These vehicles rely on the rigidity of these parts to eliminate unwanted side to side swaying of the vehicle due to the wind, uneven road surfaces or passing vehicles. In many cases the overall allowable dimensional clearances between the suspension parts along with the flexing of the spring assemblies, air suspension components, roll bars and shock absorbers won't keep the vehicle from experiencing notable unwanted side to side swaying. This swaying occurs when the vehicle frame is allowed to move from side to side independent of the rear axle assembly. In other words the frame moves from side to side and the rear axle assembly does not. In many vehicles, especially motor homes, school buses, extended vans, older and high mileage vehicles, the swaying can be extreme enough to produce an unsafe driving condition. This swaying action requires immediate steering corrections by the driver to keep the vehicle going straight down the road. In extreme situations, it is a continuous reaction.

Prior art provides a single sway bar design to correct this condition. An example of this design is shown in FIG. 7. The sway bar assembly has rotational bearing type mounting attachments on each end. The sway bar assembly is attached perpendicular to the vehicle frame by a frame attachment bracket on one end and crosses to the opposite side of the vehicle where it is attached to the rear axle assembly by an axle or spring attachment bracket on the other end. Patent US 2002/0005623 A1 item 88, U.S. Pat. No. 6,523,842 B2 item 88 or U.S. Pat. No. 5,039,124, item 62 are examples of this design. Unwanted side to side movements are then reduced by the addition of the solid connected sway bar device between the frame and rear axle assembly. A primary problem with this design, even though it reduces side to side swaying during some driving conditions, is that it actually induces side to side frame to axle movement when the vehicle hits a bump or dip in the road and the rear axle attachment point rebounds up or down. The side to side frame shifting is caused by the arch curve induced by the single sway bar when it moves up and down. The rear axle attachment point of the sway bar assembly will rotate in an arch curve around the frame attachment point. This design will force the rear axle assembly to move away or toward the frame attachment point as the bar travels up or down on a rotational arch. A graphic example of this movement is shown in FIG. 8. On a typical installation, the side induced movement can be approximately three thirty seconds of an inch on a rear axle that rebounds from its normal riding position up to its maximum allowable height at the frame-mounted axle stop pad. That dimension is approximately one half of the total measured side to side movement of a non sway bar modified stock suspension.

Prior art actually induces into the vehicle what it is intended to correct. It only works to effectively eliminate side sway when rough roads, wind or passing vehicles are not affecting the vehicle springs up or down. Simply put, it works as designed when the vehicle is traveling down a smooth highway. During severe driving conditions especially on rough roads, compounded by passing of large vehicles and extreme crosswinds, vehicle drivers experience the most difficult driving challenges. The best vehicle stability possible is needed at that time and the current single sway bar control system fails to meet that requirement. It actually induces side to side shifting when the vehicle is experiencing its greatest stability challenges. An improved sway bar design is needed to correct that design deficiency. Improved vehicle safety and operational control of the vehicle is obtainable with the improved design of my invention. The design greatly reduces the frame side to side movement in relation to the rear axle while making sure the rear axle is allowed to freely move up and down perpendicular to the ground without the product's design inducing unwanted side movement.

BACKGROUND OF INVENTION-OBJECTS AND ADVANTAGES

Accordingly, several objects and advantages of my invention are:
  (a) to provide a device that is easily installed on any new or used front engine rear wheel driven vehicle.
  (b) to provide a device that will greatly eliminate unwanted side to side vehicle swaying as currently allowed by many existing vehicle suspension designs.
  (c) to provide an improved design that will not induce unwanted side to side vehicle swaying when the rear axle assembly rebounds up or down due to normal or abnormal driving conditions as does the single sway bar prior art design.
  (d) to provide a design that will reduce the unsafe conditions imposed by unwanted vehicle side to side swaying during all driving conditions.
  (e) to provide a design that will greatly reduce driver steering corrections imposed by the continuous side to side swaying allowed by some rear suspension systems.
  (f) to reduce driver fatigue caused by the continuous driver steering corrections imposed by the continuous side to side swaying allowed by some rear suspension systems.

Further advantages are to provide a design that is lightweight, strong, easily maintainable and long lasting. All primary moving parts have rubber seals to protect from dirt ingestion. They also have grease nipples to allow continued maintenance. Examples are the rod end attachments and the telescoping rod assembly. The ball rod ends used are commercially available heavy-duty truck front wheel steering tierod ends. They are readily available at many automotive parts stores, thus allowing easy replacement of the parts that may experience wear during use. This design also assures minimal unwanted side movement as would be allowed by polyurethane or rubber being used in the construction of the rod end bearings as provided in some prior art designs currently available on the market.

It should be noted that the use of front wheel steering tierod ends is not a requirement of the sway bar assembly design. Their use intent was to provide improved maintainability, long lasting, inexpensive, closer tolerance and readily available replacement parts. Any rod end bearing design, polyurethane, rubber, greaseable, not greaseable, sealed or unsealed will only affect the assembly's close tolerance control abilities, its manufacturing cost and its in use life expectancy. Manufacturing cost and desired rod end bearing life will ultimately determine the final manufactured design. Correcting the arch curve induced frame to rear axle side swaying created by prior art single sway bar designs during up and down rear axle movement is the primary design intent of this patent.

SUMMARY

The present invention has for its objective not only to eliminate most of the excessive side to side swaying of some factory stock vehicle rear suspension systems but to, most importantly, eliminate most of the unwanted side to side vehicle swaying induced by prior art single bar designs as the rear axle assembly moves vertically toward or away from the vehicle's frame.

DRAWINGS—FIGURES

FIG. 4 shows a view of the torque control assembly

FIG. 6 shows a graphic view of my invention's sway bar resultant reaction from an axle up or down movement.

FIG. 7 shows a view of prior art.

FIG. 8 shows a graphic view of prior art's sway bar resultant reaction from an axle up or down movement.

Figure 1:
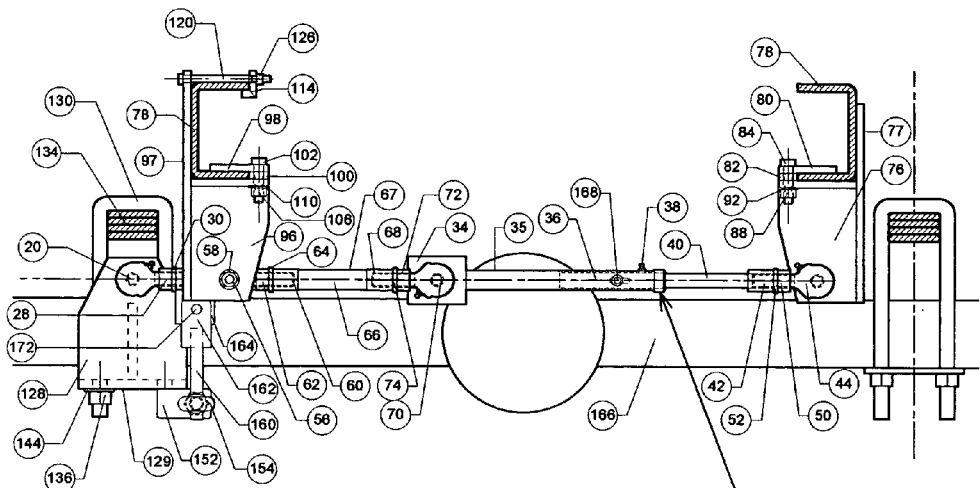
FIG. 1 shows a view of my invention looking from the back to the front.

| DRAWINGS - Reference Numbers | |
|---|---|
| 20 | rod end brng. - rt. thread shaft |
| 22 | attachment nut |
| 24 | locking washer |
| 26 | rod end attachment - rt. threads |
| 28 | locking nut |
| 30 | locking washer |
| 32 | left sway control rod |
| 34 | mounting plate |
| 35 | sway control rod assy. |
| 36 | right sway control rod |
| 38 | grease nipple |
| 40 | telescoping rod |
| 42 | rod end attachment |
| 44 | rod end brng. - rt. threads |
| 46 | attachment nut |
| 48 | locking washer |
| 50 | locking nut |

| DRAWINGS - Reference Numbers -continued | |
|---|---|
| 52 | locking washer |
| 54 | rod end brng. - left thread shaft |
| 56 | attachment nut |
| 58 | locking washer |
| 60 | rod end attachment - left threads |
| 62 | locking nut - left threads |
| 64 | lock washer |
| 66 | vertical control rod |
| 67 | vertical control rod assy. |
| 68 | rod end attachment - rt. threads |
| 70 | rod end brng. - rt. threads |
| 71 | attachment nut |
| 72 | locking nut |
| 73 | locking washer |
| 74 | locking washer |
| 76 | bracket |
| 77 | rt. frame bracket assy. |
| 78 | frame assy. |
| 80 | plate |
| 82 | spacer |
| 84 | bolt |
| 86 | bolt |
| 88 | nut |
| 90 | nut |
| 92 | locking washer |
| 94 | locking washer |
| 96 | bracket |
| 97 | left frame bracket assy. |
| 98 | plate |
| 100 | spacer |
| 102 | bolt |
| 104 | bolt |
| 106 | nut |
| 108 | nut |
| 110 | locking washer |
| 112 | locking washer |
| 114 | bracket |
| 116 | bolt |
| 118 | bolt |
| 120 | bolt |
| 122 | locking nut |
| 124 | locking nut |
| 126 | locking nut |
| 128 | bracket |
| 129 | axle/spring bracket assy. |
| 130 | U bolt |
| 132 | U bolt |
| 134 | springs |
| 136 | nut |
| 138 | nut |
| 140 | nut |
| 142 | nut |
| 144 | locking washer |
| 146 | locking washer |
| 148 | locking washer |
| 150 | locking washer |
| 152 | pad |
| 154 | threaded shaft rod end bmg. |
| 156 | locking nut |
| 157 | locking washer |
| 158 | locking nut |
| 159 | locking washer |
| 160 | rod |
| 162 | yoke |
| 164 | attachment pad |
| 166 | axle assembly |
| 168 | torque bolt |
| 170 | locking nut |
| 172 | pin |
| 174 | cotter pin |
| 176 | foam dust cover |
| 178 | dust cover cap |
| 180 | hose clamp |
| 182 | hose clamp |
| 184 | grease seal cover |

DETAILED DESCRIPTION—FIGS. 1,2,3, 4, and 5—PREFERRED EMBODIMENT

A preferred embodiment of the sway bar invention is illustrated in FIGS. 1, 2, 3 4 and 5. The sway control rod assembly 35 is a welded, machined and bolted assembly. It is manufactured from steel pipe stock, steel plate stock, inside diameter threaded steel hexagon bar stock, steel rod stock, rod end bearing assemblies, nuts, and locking washers. Starting at the left side of the assembly and going right the detail parts include a rod end bearing 20, attachment nut 22 (not shown), and locking washer 24 (not shown). Rod end bearing 20, its attachment nut 22 (not shown) and locking washer 24 (not shown) are threaded into hexagon rod end attachment 26 and locked in position by locking nut 28 and locking washer 30. Hexagon rod end attachment 26 is welded to left sway control rod 32. A mounting plate 34 is welded to left sway control rod 32. Mounting plate 34 has a machined hole in its center position. The hole is machined to accept the tierod 70 tapered attachment mounting bolt. Mounting plate 34 is welded to the right sway control rod 36 which has a grease nipple 38 installed near the right end. A telescoping rod 40 slides freely in and out of right sway control rod 36. Telescoping rod 40 has a hexagon rod end attachment 42 welded to the right end. Rod end bearing 44, with attachment nut 46 and locking washer 48 are threaded into hexagon rod end attachment 42 and secured in position by locking nut 50 and locking washer 52. The junction of telescoping rod 40 and the right sway control rod 36 are protected from dust and moisture by a grease seal cover 184 and secured in place by two hose clamps 180 and 182.

The vertical control rod assembly 67 is a welded, machined and bolted assembly. It is manufactured from steel pipe stock, inside diameter threaded hexagon bar stock, nuts, locking washers, and rod end bearing assemblies. The assembly instructions start at the left side and progress to the right. The detail parts include a left-hand threaded rod end bearing 54, attachment nut 56, and locking washer 58. Rod end bearing 54, its attachment nut 56, and locking washer 58 are threaded into a left-hand threaded hexagon rod end attachment 60 and locked in position by a left-hand threaded locking nut 62 and locking washer 64. The rod end hexagon attachment 60 is welded to a vertical control rod 66. The vertical control rod 66 is welded to right-hand threaded hexagon rod end attachment 68. Rod end bearing 70, its attachment nut 71, and locking washer 73 are threaded into hexagon rod end attachment 68 and secured by locking nut 72 and locking washer 74.

The right frame bracket assembly 77 is a welded, machined and bolted assembly. The assembly material is steel plate stock, nuts, bolts, and locking washers. Bracket 76 has a hole machined in its section, which is perpendicular to the frame assembly 78 to accept the tapered attachment bolt from rod end bearing 44. Bracket 76 is secured to the frame assembly 78 by sandwiching the frame assembly 78 between the bracket 76 and plate 80. The spacer 82 is installed between the bracket 76 and plate 80 to assure bracket 76 is securely retained in its intended position. Bolts 84, 86, nuts 88, 90, locking washers 92, and 94 secures plate 80, spacer 82, and bracket 76 to the frame assembly 78.

The left frame bracket assembly 97 is a welded, machined and bolted assembly. It is manufactured from welded plate, bolts, nuts, and locking washers. Bracket 96 has a hole machined in its section, which is perpendicular to the frame assembly 78 to accept the tapered attachment bolt from rod end bearing 54. The bracket 96 is secured to the frame assembly 78 on the bottom by sandwiching the frame assembly 78 between the bracket 96 and plate 98. A spacer 100 is installed between the bracket 96 and plate 98 to assure bracket 96 is securely retained in its intended position. Bolts 102, 104, nuts 106, 108 (not shown), and locking washers 110, 112 (not shown) secures plate 98, spacer 100, and bracket 96 to frame assembly 78. Bracket 114 is attached to bracket 96 across the top section of the frame assembly 78 by installing bolts 116,118,120, and locking nuts 122,124, 126.

The axle/spring bracket assembly 129 is a welded and machined assembly manufactured from steel plate stock. Holes are drilled in bracket 128, the horizontal plate section, to match the four threaded end positions of the spring assembly U bolts 130 and 132. The vertical section of the bracket 128 has a hole machined to accept the tapered attachment bolt of rod end bearing 20. The assembly is attached to the bottom of the left side spring assembly 134 using the existing or extended, if needed, U-bolt 130 and 132. The existing U-bolts 130 and 132, rear axle assembly 166 to spring assembly 134, retention nuts are left installed. The bracket 128 is installed up against the existing U bolt 130 and 132 nuts using mounting nuts 136, 138, 140, 142, and locking washers 144, 146, 148, 150 underneath to secure the bracket 128 to the spring assembly 134 bottom side.

An exploded view of the torque control assembly is shown in FIG. 4. During operational use, the vehicle's sway induction forces will apply loads to the vertical control rod assembly 67 and sway control rod assembly 35. When the rod assemblies 67 and 35 are not parallel, the forces will induce rotational loads to the rod end bearings 20, 44, 54, and 70. Their design will allow the rod assembly 35 to rotate. This is accomplished by the rod end bearings 20, 44, 54, and 70 outer bearing races rotating on their inside ball bearings. This rotation will induce unwanted dimensional changes in the assemblies thus eliminating the desired sway control function of the assembly. The torque control assembly, FIG. 4 is designed to eliminate the rotational movement of the sway control rod assembly 35 while allowing free unrestrained up and down movement of the assembly. The torque control assembly, FIG. 4 is a welded, machined and bolted assembly. It is manufactured from plate stock, rod stock, nuts, lock washers, and a threaded rod end bearing. The torque control assembly, FIG. 4 links the sway control rod assembly 35 to the axle/spring bracket assembly 129. This eliminates the torque rotational reaction on rod end bearings 20, 54, and 70. Torque control assembly mounting pad 152 is welded to bracket 128. Torque control pad 152 has a hole drilled in it to accept the threaded shaft rod end bearing 154. The threaded end of the threaded shaft rod end bearing 154 is inserted into the torque pad 152 hole and secured by locking nuts 156, 158, and locking washers 157 and 159. Rod 160 is installed in the threaded shaft rod end bearing 154 hole. Rod 160 is welded to a yoke 162. Yoke 162 has a hole drilled in both sides of the yoke 162 which matches the hole drilled in attachment pad 164. A pin 172 is installed through the yoke 162 holes and attachment pad 164 hole thus securing the two parts. Cotter pin 174 is inserted and secured in pin 172 to assure the pin 172 is retained in the assembly. Attachment pad 164 is welded to the bottom left side of rod end attachment 26 and left sway control rod 32. This now secures the rotational forces exerted on the sway control rod assembly 35 to the solid mounted axle/spring bracket assembly 129. Rod end bearing 20, 54, and 70 will now not rotate. The sliding action of rod 160 into the threaded shaft rod end bearing 154 along with the exposed ball end bearing of the threaded shaft rod end bearing 154 is protected from dust by a foam dust cover 176 and a dust cover cap 178.

Figure 5:
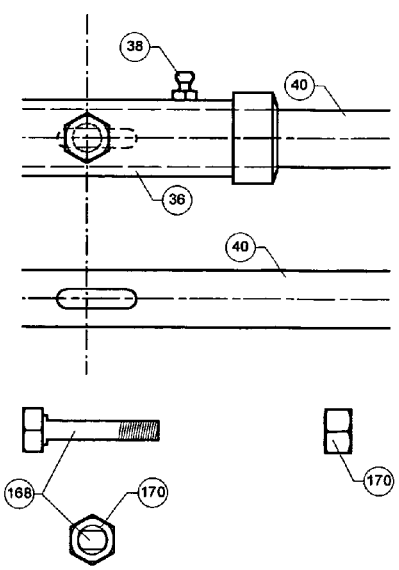
FIG. 5 shows a second torque control assembly
Figure 2:
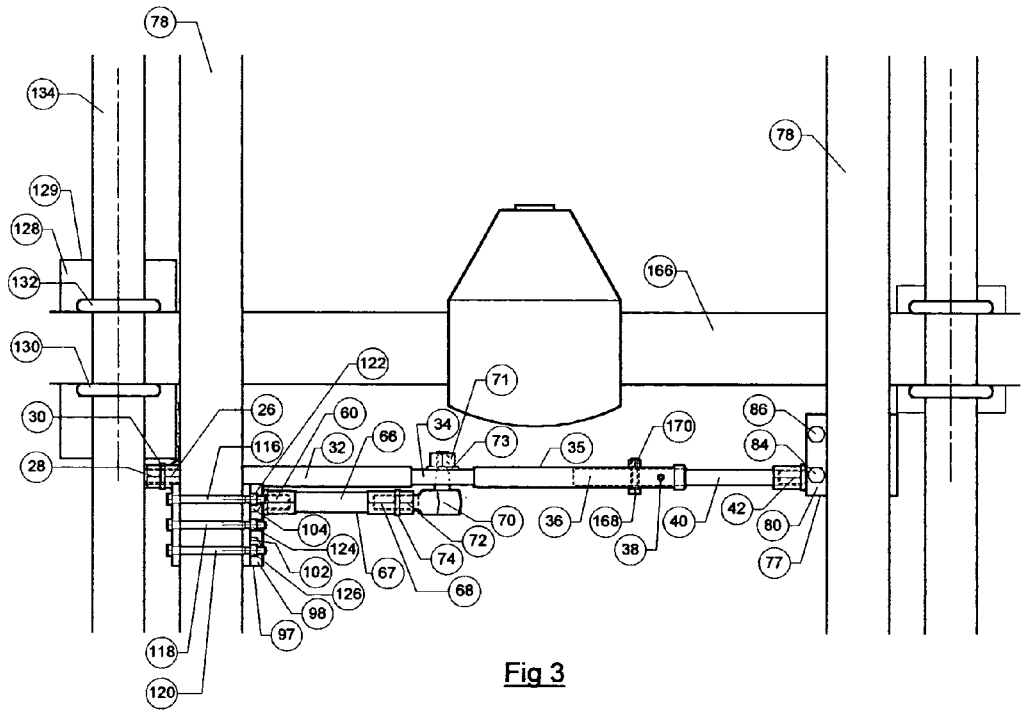
FIG. 2 shows a view of my invention looking from the top down.
Figure 3:
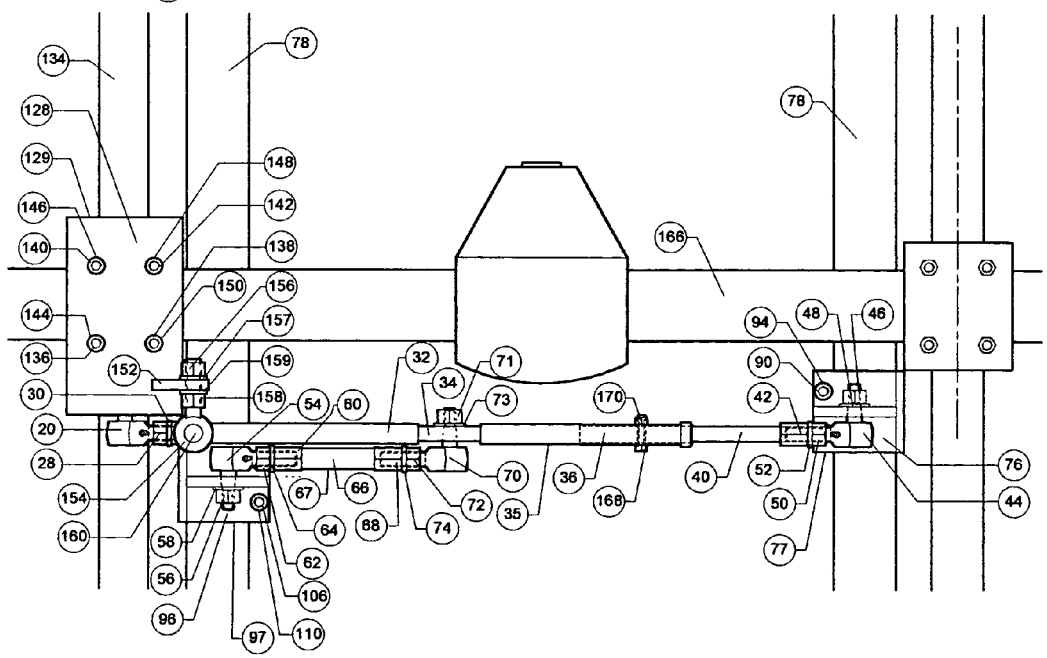
FIG. 3 shows a view of my invention looking from the bottom up.

FIG. 5 identifies the second torque control requirement. It incorporates a torque bolt 168 with both sides machined flat to increase its wear surface. The torque bolt 168 is installed through a round hole drilled in rod 36, through a loose fit horizontal slotted hole machined in telescoping rod 40 and through an opposite side slotted hole in rod 36. The torque bolt 168 is retained in place by a locking nut 170. Torque bolt 168 then transfers any twisting action of telescoping rod 40 and rod end bearing 44 to the secured sway control rod assembly 35 as previously outlined in FIG. 4. The horizontal slot in telescoping rod 40 will then allow telescoping rod 40 to side in and out of the right sway control rod 36. This now assures rod end bearing 44 does not rotate on its ball allowing unwanted movement in the assembly.

It should be noted that either of the frame assembly 78 bracket assemblies 77 or 97 may be directly welded to the frame assembly 78 versus bolted as described above. The bolted procedure described was intended to provide a means of assembly that would not require the availability of a suitable welding machine.

Installed Description

The axle/spring bracket assembly 129 is installed with the tapered hole mounting plate up and to the rear of the vehicle. It is attached under spring assembly 134 using the existing or extended, if required, U-bolts 130 and 132. Nuts 136, 138,140,142, and locking washers 144, 146, 148,150 are used to secure bracket assembly 129.

The right frame bracket assembly 77 is attached to the right side frame assembly 78. Bracket 76 is secured to the frame assembly 78 by sandwiching the frame assembly 78 between the bracket 76 and plate 80. Spacer 82 is installed between the bracket 76 and plate 80. The rod end bearing hole attachment plate on bracket 76 is installed perpendicular directly across from the tierod mounting hole plate face of bracket 128. Attachment bolts 84,86, lock washers 92,94, and nuts 88,90 secure the assembly.

The left frame bracket assembly 97 is attached on the left side frame assembly 78 approximately three and one half inches more to the rear of the vehicle from axle assembly 166 than bracket assembly 77 was installed on the right side frame assembly 78. Bracket 96 is secured to the frame assembly 78 on the bottom by sandwiching the frame assembly 78 between the bracket 96 and plate 98. Spacer 100 is installed between the bracket 96 and plate 98. Bolts 102, 104, nuts 106,108 (not shown), and lock washers 110,112 (not shown) are used to secure plate 98, spacer 100, and bracket 96 to the frame assembly 78. Bracket 114 is attached to bracket 96 across the top section of the frame assembly 78 by bolts 116,118,120, and locking nuts 122, 124,126.

The tapered bolt on rod end bearing 44 of sway control rod assembly 35 is inserted into the machined-tapered hole in bracket 76 and secured in position by nut 46 and locking washer 48. Locking nut 50 is tight and correctly adjusted as received. Locking nut 50 and locking washer 52 locks rod end bearing 44 securely to rod end attachment 42. The tapered bolt on rod end bearing 20 is inserted into the machined-tapered hole in bracket 128 and secured in position by attachment nut 22 (not shown) and lock washer 24 (not shown). Locking nut 28 is tight and correctly adjusted, as received. Locking nut 28 and locking washer 30 locks rod end bearing 20 securely to rod end attachment 26.

The tapered bolt on rod end bearing 54, of vertical control rod assembly 67 is installed into the machined-tapered hole on bracket 96 and secured by nut 56 and locking washer 58. Locking nuts 72 and 62 are loose. The tapered bolt on rod end bearing 70 is installed into the machined-tapered hole in mounting plate 34 and secured with attachment nut 71 and locking washer 73. Vertical control rod 66 requires twisting clockwise or counter clockwise to allow the tapered bolt on rod end bearing 70 to perpendicularly enter the center of the hole on plate 34.

The sway control assembly was designed to be installed with the vehicle at its normal at rest position. Since not all frames and springs will be at the same position, minor adjustments will be required on most installations. Proper installation requires the sway control rod assembly 35 and the vertical control rod assembly 67 to be parallel with each other prior to tightening locking nuts 62 and 72. The lowest to the ground of the three following rod end bearings 20, 54 or 44 must be raised at their frame or axle positions so the two rod assemblies, 67 and 35 are parallel. After the two rod assemblies are parallel the vertical control rod 66 was twisted to find its true center position. That is when it is not loaded either in or out by the installation. Rod 66 will easily rotate a small amount clockwise or counter clockwise at that position. When this adjustment is achieved, locking nuts 62 and 72 are secured while making sure control rod 66 does not rotate. The sway control assembly is then ready for use.

NOTE: The sway control assembly is installed as shown to document its basic installation function. The sway control assembly could be redesigned and installed in reverse, left to right, of its shown installation and still function as designed.

Operation—FIGS. 1, 2, 3, 4, 5, 6, 7, and 8

The unique design feature on this invention, FIGS. 1, 2, 3, 4, and 5, is that it constrains the vehicle frame from swaying side to side when the rear axle assembly 166 reacts up or down during normal or severe driving conditions. The prior art design, FIG. 7, actually induces side to side movement, FIG. 8, when the rear axle assembly 166 moves up or down; i.e. the vertical distance between axle assembly 166 and frame assembly 78 changes. The single bar prior art designed sway bar, FIG. 7 actually induces, on rough roads, approximately fifty percent of the total unwanted sway as measured side to side of an unmodified vehicle.

When the rear axle assembly 166 moves up or down, due to its reaction from driving conditions, spring assembly 134 along with axle/spring attachment bracket assembly 129 and the left side of the sway control rod assembly 35 also move up or down. As the left side of the sway control rod assembly 35 moves up or down telescoping rod 40, supported by right frame bracket assembly 77, telescopes in and out of the right sway control rod 36. This telescoping action will thus eliminate the forced arch curve that a one-piece rod would travel. See FIG. 8. This feature allows rear axle assembly 166, spring assembly 134 and axle/spring bracket assembly 97 to respond basically straight up and down perpendicular to the ground. Sway control rod assembly 35 rotates around the frame assembly 78 right side frame bracket assembly 77 attachment point.

The vertical control rod assembly 67 rotates in a fixed arch around frame assembly 78 mounted left side frame bracket assembly 97 attachment point. As the left side of sway control rod assembly 35 moves up or down, rotating clockwise or counter clockwise, vertical control rod assembly 67, attached to mounting plate 34 and to frame assembly 78 mounted left side frame bracket assembly 97 will rotate in the opposite direction around frame assembly 78 mounting left side frame bracket assembly 97 attachment point. The counter rotational movement of the vertical control rod assembly 67 will control the amount of telescopic movement of telescoping rod 40 in or out of right sway control rod 36 of sway control rod assembly 35. In other words, as the two rod assemblies 35 and 67 rotate in opposite directions, vertical control rod assembly 67 will cause the telescoping action of sway control assembly 35 to extend or retract. This controlled extension or retraction will allow axle/spring bracket assembly 129 to travel generally in a straight up or down movement as measured side to side. The designed length of sway control rod assembly 35, its attachment point position at plate 34, and the length of vertical control rod assembly 67 assure the desired dimensional movement controls are maintained. The movement of axle/spring bracket assembly 129 is now secured to travel straight up or down within a few thousands of an inch as measured from side to side. See FIG. 6 for a graphic view of this action. Any unwanted side to side frame assembly 78 to axle assembly 166 movement is thus almost totally eliminated.

The counter rotating design of the two rods, with the telescoping function, allows the assembly to control side to side frame assembly 78 to rear axle assembly 166 shifting during all driving conditions. Its design does not induce into the vehicle the unwanted side to side movement, illustrated in FIG. 8, on rough roads as does prior art single bar designs, illustrated in FIG. 7.

FIG. 4 is a detailed view of the torque control design feature. The sway control forces exerted by the vertical control rod assembly 67 as it moves up or down will cause the sway control rod assembly 35 rod end bearing 20, 44, and 70 to twist on their ball ends. The torque control feature, FIG. 4 assures the sway control rod assembly 35 does not rotate resulting in rod end bearing 20 and 70 to rotate on their ball ends. The rotation of the ball assembly would allow unwanted side movement in the assembly that would negate the desired close tolerance side to side controls intended for the total sway control assembly.

FIG. 5 shows the second torque control feature. It shows an exploded view of a bolt 168 with two sides machined flat installed through rod 36 and through a loose fit elongated hole machined in telescoping rod 40. Locking nut 170 secures torque bolt 168 in place. Since the right sway control rod assembly 35 has been secured from rotation by the design shown in FIG. 4, torque bolt 168 will then restrict any turning action of telescoping rod 40 while allowing the desired telescoping action of telescoping rod 40 in and out of the right sway control rod 36. This assures rod end bearing 44 does not rotate on its ball allowing unwanted side movement in the assembly that would negate the designed close tolerance side to side control of the side sway control assembly.

I note that the as drawn frame bracket assemblies 77 and 97 along with the axle/spring bracket assembly 129 may require modifications from their as shown design to adapt to the various vehicle frame assembly and axle/spring assembly designs on the market. Their as drawn intent was to show their functional use in the design of the invention.

I note that if the invention design used polyurethane or rubber bushings mounted in a steel ring with solid mounting bolts, steel sleeves, and flat washers, the assembly would not need any of the torque design features shown in FIG. 4 and FIG. 5. That design would give up some unwanted side to side movement due to the elasticity of the bearings but the assembly would provide much improved frame side movement in relation to the rear axle assembly on rough roads over the previous prior art single bar designs. Manufacturing cost and resultant profits will ultimately dictate this manufacturing decision.

In compliance with the statute, the invention has been described herein in language more or less specific as to the structural features. It should be understood, however, that the invention is not limited to the specific features shown, since the means and construction shown, comprise only some of the preferred embodiments for putting the invention into effect. The invention is therefore claimed in any of its form or modifications within the legitimate and valid scope of the amended claims, appropriately interpreted in accordance with the doctrine of equivalents.

I claim:

1. A motor vehicle sway control assembly for suspension systems for reducing unwanted frame to rear axle/spring assembly side to side swaying during all driving conditions, said motor vehicle sway control assembly comprising:
   a. a rear axle/spring attachment bracket designed to attach to said rear axle/spring assembly on a first side of a vehicle configured to accept attachment of a rotating bearing type attachment device;
   b. a first frame attachment bracket designed to attach to a frame of said vehicle on an opposing side thereof from said rear axle/spring assembly, said first frame attachment bracket configured to accept attachment of a rotating bearing type attachment device;
   c. a sway control rod with a first rotating bearing type attachment device on a first end thereof and a second rotating bearing type attachment device on a second end thereof, and with a mounting plate connected to a mid section thereof, said mounting plate configured to accept attachment of a rotating bearing type attachment device, said sway control rod assembly comprising a telescoping section proximate said second end, said telescoping section with said second rotating bearing type attachment device attached to said first frame attachment bracket, said first rotating bearing type attachment device attached to said rear axle/spring attachment bracket;
   d. second frame attachment bracket designed to attach to said frame proximate rear axle/spring attachment bracket, and designed to accept attachment of a rotating bearing type attachment device; and
   e. a vertical control rod assembly having a third rotating bearing type attachment device on a first end thereof and a fourth rotating bearing type attachment device on a second end thereof, wherein said third rotating bearing type attachment device is attached to said second frame attachment bracket and said fourth rotating bearing type attachment device is attached to said mounting plate of said sway control rod assembly;
   wherein said sway control rod assembly reduces unwanted frame to rear axle/spring assembly side to side swaying.

2. The motor vehicle sway control assembly of claim 1, further comprising a torque control device operably connected to said sway control rod to prevent rotation of said sway control rod about a longitudinal axis thereof.

* * * * *